Feb. 22, 1927.　1,618,651
B. D. GIBBS
STABILIZER FOR AUTOMOBILES
Filed Feb. 6, 1926

INVENTOR.
Burton D. Gibbs,
BY Frank A. Cutter
ATTORNEY.

Patented Feb. 22, 1927.

BEST AVAILABLE COP'

1,618,651

UNITED STATES PATENT OFFICE.

BURTON D. GIBBS, OF WESTFIELD, MASSACHUSETTS.

STABILIZER FOR AUTOMOBILES.

Application filed February 6, 1926. Serial No. 86,435.

My invention relates to improvements in stabilizing attachments for automobiles, and consists essentially of a weight, and means to attach the same to a spring shackle, and in close proximity thereto, together with such other parts and members as may be necessary or desirable in order to render the attachment or stabilizer complete and serviceable in every respect, all as hereinafter set forth.

My stabilizers are generally used in sets of four, there being one located adjacent to each end of each spring, or to the end of each spring that has a shackle connection, and said stabilizers are also generally made in rights and lefts. In some cases, however, two of the stabilizers might be provided at one end only of the automobile, and, again in some cases, it would not be necessary to make a difference in their construction or shape, so far as the application of the same to both sides of the automobile is concerned.

The primary object of my invention is to produce comparatively simple and inexpensive means, readily applicable to automobiles, for counteracting, counterbalancing, or absorbing, as it were, the jolts, jars, and shocks due to pronounced unevenness of the roadway over which a vehicle equipped therewith is passing, without preventing the effective absorption of the small or minor jars and shocks which are due to the lesser variations in the surface of the roadway. These stabilizers in great measure prevent the road shocks from being transmitted to the frame and body of the vehicle; instead such shocks are transmitted to the stabilizer weights which are peculiarly and especially adapted to receive them. The cumulative vibrations of the frame and body of the vehicle are broken up and neutralized. This is apparently due to the fact that the stabilizer weights act or serve as independent loads having a greater tendency to vibrate than has the body of the vehicle, since the pressure exerted by the springs more readily overcomes the inertia of the weights than the inertia of the body.

Another object is to provide stabilizers which can be readily attached to the vehicle without materially changing any part of the construction thereof, and in places ample for their vibration or oscillation.

My stabilizers dispense with the need for shock-absorbers, snubbers, and the like, and serve equally well and even better and more efficiently than such devices.

Other objects and advantages will appear in the course of the following description.

I attain the objects and secure the advantages of my invention by the means illustrated in the accompanying drawings, in which—

Figure 1:
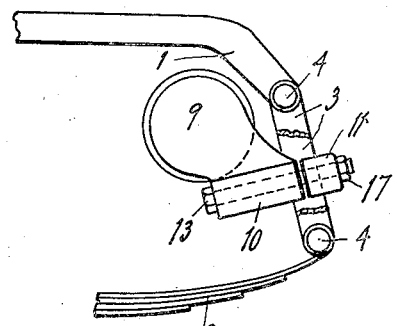
Figure 2:
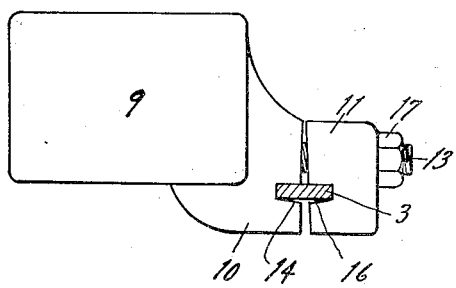
Figure 3:
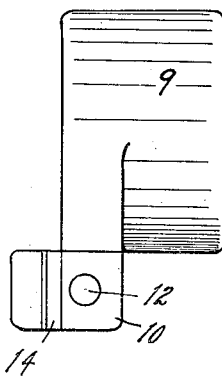
Figure 4:
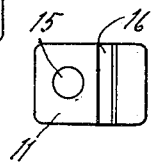
Figure 5:
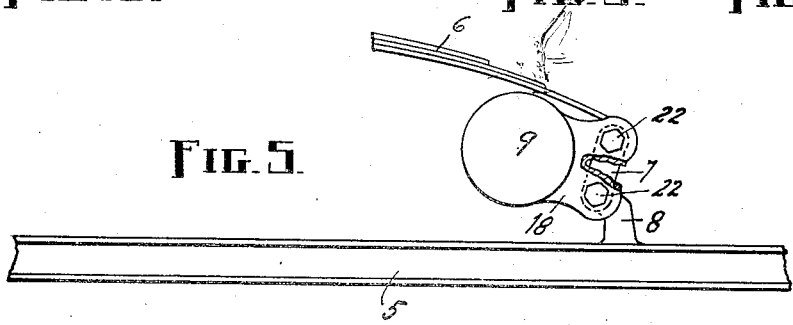
Figure 6:
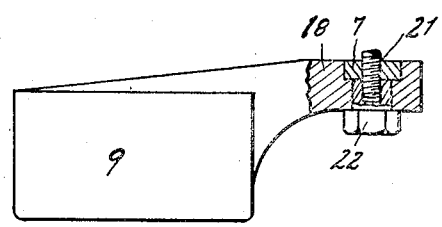
Figure 7:
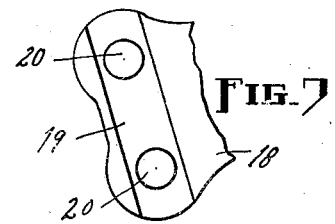

Figure 1 is a side elevation of a stabilizer which embodies a practical form of my invention, showing the same applied to a shackle at the rear end of a side spring of an automobile; Fig. 2, an enlarged, rear end elevation of the weight and lug of said stabilizer; Fig. 3, an enlarged, front end elevation of the clamping block of said stabilizer; Fig. 4, an enlarged, top plan of the stabilizer, the shackle plate to which the same is secured being shown in section; Fig. 5, a side elevation of a modified form of the stabilizer, showing the same applied to a shackle for one end of a transverse spring of an automobile; Fig. 6, an enlarged, top plan in partial section of said last-named stabilizer, and, Fig. 7, an enlarged detail of the stabilizer lug shown in Figs. 5 and 6.

Similar reference characters designate similar parts throughout the several views.

The parts of springs and their connections, illustrated in Figs. 1 and 5, are to be considered merely as examples, because it is to be understood that there are many kinds of springs, and spring-supporting means which include shackles, in use in the automobile art, and it is the shackles and their plates, rather than the springs themselves, with which my invention is more intimately associated from a material or mechanical standpoint, since it is to these that the stabilizers are directly attached. The stabilizers can be used to advantage wherever there are shackles and shackle plates to which the same can be attached, and there is sufficient space adjacent to said shackles and their plates to accommodate the stabilizer weights and permit them to oscillate.

In Fig. 1 are shown portions of an automobile frame horn 1 and a side or longitudinally-extending spring 2 which are pivotally connected by a pair of shackle plates 3 and a pair of shackle bolts 4. To the outside plate 3 one of my stabilizers is secured. The intermediate portion of the inside plate 3 is broken away to show parts of the stabilizer which otherwise would be hidden by said plate. The parts and members of the automobile just referred to are located at the rear end and on the right-hand side of the machine.

In Fig. 5 are represented portions of the front axle 5 and front spring 6, and one of the front shackle plates 7, by means of which and a yoke and nuts (not shown), said spring at one terminal is pivotally connected with a lug 8 rising from said axle. A stabilizer especially adapted to this type of spring connection is also shown secured to the plate 7 and the axial members of the shackle.

In each case the stabilizer consists in part of a weight 9, which I have found should tip the scales to about ten pounds. Usually the weight 9 is cylindrical in shape. The weight of each stabilizer must be provided with means for securely attaching the same to one of the shackle plates 3 or 7, with said weight as near the plate as it is practical to have it.

In the first construction illustrated in connection herewith, the weight 9 has an integral, comparatively short lug 10 which extends beyond the periphery of said weight, and is offset from one side thereof, and there is associated with said lug a clamping block 11. There is a passage 12 which extends through the lug 10 from end to end to receive a bolt 13, and there is also in the end of said lug which is most remote from the weight 9 an approximately vertical slot 14. The block 11 has an opening 15 therethrough also to receive the bolt 13. The block 11, which is adapted to be arranged on the bolt 13 in cooperative position relative to the end of the lug 10 that is most remote from the weight 9, has in the face thereof that is adjacent to the face of said lug, in which is located the slot 14, a complementary slot 16. The slots 14 and 16 are of a suitable size to receive therein opposite, longitudinal edge portions of either shackle plate 3, and, in order to enable said plate to be tightly grasped by and between the lug 10 and the block 11, the outer sides of the slots 14 and 16 are inclined outwardly or made flaring. These slots are not deep enough to receive the entire width of the shackle plate. A nut 17 is provided for the bolt 13 outside of the block 11.

To attach the stabilizer to the outer plate 3, the lug 10 is first placed in position against said plate, with the front edge portion of the latter in the slot 14, the block 11 is then placed on the bolt 13 and moved rearwardly thereon until the rear edge portion of said plate is received in the slot 16, and finally the nut 17 is screwed on to the rear end of said bolt and tightened against the contiguous end of said block, whereby the latter is caused forcibly to engage the plate and the outer edge of the block to bear on the outer edge of the adjacent end of the lug 10. Thus it is seen that there is a V-shaped space or opening left between the adjacent faces of the lug 10 and the block 11, and that said block fulcrums on said lug, and that in this way provision is made to enable said block to be forced by the nut 17 into such tight contact with the plate 3, which is grasped between the lug 10 and the block, that the weight 9 is securely and rigidly attached to and supported from said plate. The opening 15 in the block 11 must be sufficiently large to enable said block to be tilted on the bolt 13, when forced into tilting relation with the lug 10 by the intervening plate 3, the width of which is greater than the combined depths of the slots 14 and 16.

The weight 9 is supported, by the means and in the manner above described, from the outer plate 3 outside of the vertical plane of said plate. If found expedient or necessary, the weight 9 may be supported from the inner plate 3, in which event said weight is positioned inside of the vertical plane of said plate, and projects downwardly instead of upwardly. If there were sufficient space for the weight to oscillate in, the stabilizer might be attached to the outer plate in inverted position, and to the inside plate in erect position or with the weight above and its lug below.

It is merely necessary, of course, in order to remove the stabilizer from the supporting shackle plate, to unscrew the nut 17 and remove it and the block 11 from the bolt 13.

Portions of the lug 10 and the block 11, which are inside of the plate 3 to which they are attached, are necessarily between the two plates in the pair; but there is sufficient space between said plates to receive such portions.

In practice, one of the stabilizers is secured to each of the outer shackle plates in each of the four pairs with which the automobile is equipped, or else two each of the inner of such plates, or, in some cases, the stabilizers might be attached to the outer shackle plates at the front end and to the inner shackle plates at the rear end of the machine, or vice versa.

The weight 9 oscillates with the shackle plate upon which it is mounted, as said plate rocks or vibrates under the impulsion or the influence of the spring and load pivotally connected in part by said plate, with the result that the more severe shocks and jars are absorbed by said weight, as hereinbefore pointed out. This is due, of course, to the fact that the weight, as an independent load, is supported from and very close to the shackle plate. If the weight were supported by the plate but at some distance therefrom, the desired effect would be unattainable, and not only that but the load would be more unstable than ever, or would ride with more instead of less shock, jar, and excessive vibration.

The weight 9, in the Fig. 5 construction, has a short integral lug 18, the outer face adjacent to the outer end of which is an approximately vertical groove or channel 19, and through which extend openings 20—20, said openings at their inner ends communicating with said slot. The lug 18 not only extends beyond the periphery of its weight 9, but is offset from one side of said weight.

In automobiles having transverse springs, and in the Ford car especially, each shackle is made up of a yoke and a plate, such as the plate 7, which plate is held in place on the bolt arms of the yoke by means of two nuts, and the cross piece or head of the yoke and said plate constitute the opposite sides of the shackle. In Fig. 6 the free end portion of one of the bolt arms of a yoke, such as that just mentioned, is represented at 21, and, in place of the nut ordinarily used on such arm, I provide a special nut 22. The nut 22 is interiorly screw-threaded to receive the arm 21. The groove 19 is of a size to receive the plate 7, and each opening 20 is of a size to receive one of the nuts 22, of which there are two, one for each yoke bolt arm. The openings 20 are spaced apart a distance equal to the spaces between the aforesaid yoke arms.

To secure the lug 18 to the shackle plate 7, said lug is placed against said plate with the latter in the groove 19, and the nuts 22 are inserted in the openings 20 and screwed onto the yoke arms which extend through and protrude from said plate. Thus the lug 18 is supported by the plate 7 which is in the slot or groove 19, and by the nuts 22 which are on the yoke arms (21), and said lug is securely held against lateral displacement between said plate and the heads of said nuts.

The stabilizer shown in Fig. 5 is mounted on the yoke arms (21) and plate 7 of the right-hand, forward shackle, and the weight 9 of said stabilizer is behind the vertical plane of the back side of the spring 6. The left-hand, forward shackle is, in practice, equipped with a similar stabilizer to that which appears in Fig. 5, except that the stabilizer on the left extends to the right from its supporting plate, instead of to the left. Similar or corresponding stabilizers are also mounted on the yoke arms and plates of the shackles at the rear end of the machine. The operation and effect of the second stabilizer are similar in all respects to those of the first stabilizer.

In some cases it may be advisable or necessary to arrange the stabilizers, on the shackles of automobiles having transverse springs, in such a manner that the weights are located between the shackles and wheels, instead of between the shackles and the longitudinal, vertical, central plane of the machine, as in the example.

More or less change in the shape, size, construction, and arrangement of some or all of the parts of the stabilizer, in addition to those hereinbefore specifically pointed out, may be made, without departing from the spirit of my invention, or exceeding the scope of what is claimed.

What I claim as my invention, and desire to secure by Letters Patent, is—

1. The combination in a stabilizer of the class described, with a spring and a shackle plate therefor, of a weight provided with means to attach the same to said plate and permit it to swing freely without contacting with said spring.

2. The combination in a stabilizer of the class described, with a spring and a shackle plate therefor, of a weight provided with means to attach the same directly to said plate and permit it to swing freely without contacting with said spring.

3. The combination in a stabilizer of the class described, with a spring and a shackle plate therefor, of a weight provided with means to secure the same to said plate in close proximity thereto, and permit it to swing freely without contacting with said spring.

4. The combination in a stabilizer of the class described, with a spring and a shackle plate therefor, of a weight provided with means to secure the same directly to said plate in close proximity thereto, and permit it to swing freely without contacting with said spring.

5. The combination in a stabilizer of the class described, with a spring and a shackle plate therefor, of a weight provided with laterally offset means to attach the same to said plate and permit it to swing freely without contacting with said spring.

6. The combination in a stabilizer of the class described, with a spring and a shackle plate therefor, of a weight provided with laterally offset means to attach the same directly to said plate and permit it to swing freely without contacting with said spring.

7. The combination in a stabilizer of the class described, with a spring and a shackle plate therefor, of a weight provided with laterally offset means to secure the same to said plate in close proximity thereto, and permit it to swing freely without contacting with said spring.

8. The combination in a stabilizer of the class described, with a spring and a shackle plate therefor, of a weight provided with laterally offset means to secure the same directly to said plate in close proximity thereto, and permit it to swing freely without contacting with said spring.

9. In a stabilizer, of the class described, a weight having fixed and movable clamping means to receive edge portions of a shackle plate, and means to force said movable means into close contact with said plate.

10. In a stabilizer, of the class described, a weight having laterally offset fixed and movable clamping means to receive edge portions of a shackle plate, and means to force said movable means into close contact with said plate.

11. The combination, in a stabilizer of the class described, with a weight provided with a perforated lug, of a bolt passing through said lug, a perforated clamping block adapted to be mounted on said bolt, said lug and block being adapted to engage a shackle plate, and a nut for said bolt outside of said block.

12. The combination, in a stabilizer of the class described, with a weight provided with a laterally offset perforated lug, of a bolt passing through said lug, a perforated clamping block adapted to be mounted on said bolt, said lug and block being adapted to engage a shackle plate, and a nut for said bolt outside of said block.

13. The combination, in a stabilizer of the class described, with a weight having a perforated and slotted lug, of a bolt passing through said lug, a perforated and slotted clamping block adapted to be mounted on said bolt, the slots in said lug and block being adapted to receive a shackle plate therein, and a nut for said bolt outside of said block.

14. The combination, in a stabilizer of the class described, with a weight having a laterally offset perforated and slotted lug, of a bolt passing through said lug, a perforated and slotted clamping block adapted to be mounted on said bolt, the slots in said lug and block being adapted to receive a shackle plate therein, and a nut for said bolt outside of said block.

15. The combination, in a stabilizer of the class described, with a weight having a perforated and slotted lug, of a bolt passing through said lug, a perforated and slotted clamping block adapted to be mounted on said bolt, and a nut for said bolt outside of said block, the construction and arrangement of parts being such that a shackle plate is receivable in the slots in said lug and block, but the combined depth of said slots is less than the width of said plate, wherefore one edge of said block must bear on the contiguous edge of said lug, when said nut is tightened to cause the plate to be grasped rigidly by and between the lug and block, and a space, extending from such contacting edges, is left between the lug and block.

16. The combination, in a stabilizer of the class described, with a weight having a laterally offset perforated and slotted lug, of a bolt passing through said lug, a perforated and slotted clamping block adapted to be mounted on said bolt, and a nut for said bolt outside of said block, the construction and arrangement of parts being such that a shackle plate is receivable in the slots in said lug and block, but the combined depth of said slots is less than the width of said plate, wherefore one edge of said block must bear on the contiguous edge of said lug, when said nut is tightened to cause the plate to be grasped rigidly by and between the lug and block, and a space, extending from such contacting edges, is left between the lug and block.

BURTON D. GIBBS.